Nov. 21, 1961 E. J. SCHUBERT 3,010,053

TRIGGERED RELAY CIRCUIT

Filed Sept. 13, 1957 2 Sheets-Sheet 1

WITNESSES:

Bernard R. Gieguey

Leon J. Gaga

INVENTOR
Ernest J. Schubert

BY

George C. Thompson

ATTORNEY

Nov. 21, 1961 E. J. SCHUBERT 3,010,053

TRIGGERED RELAY CIRCUIT

Filed Sept. 13, 1957 2 Sheets-Sheet 2

3,010,053
TRIGGERED RELAY CIRCUIT

Ernest J. Schubert, Glen Burnie, Md., assignor to Westinghouse Electric Corporation, East Pittsburgh, Pa., a corporation of Pennsylvania
Filed Sept. 13, 1957, Ser. No. 683,765
2 Claims. (Cl. 317—148.5)

This invention relates to a triggered relay circuit and more particularly to a transistor circuit capable of triggering a relay in response to very short input pulses.

Relays used in systems such as Teletype systems using line relays are generally provided with circuits capable of prolonging or extending the output impulse of the system in order to provide sufficient signal length for allowing the relay to be energized. This arrangement dictates the use of more complicated circuits which are rather expensive to manufacture.

It is therefore an object of this invention to provide a relay control circuit involving a few number of parts.

It is another object of this invention to provide a relay control circuit capable of causing relay operations without the use of a delay of the input signal to the control circuit.

It is another object of this invention to provide a relay response to an input signal of small magnitude.

It is another object of this invention to provide a relay feedback to the input control circuit for providing trigger operation of the relay.

Other objects, purposes and characteristic features will become obvious as the description of the invention progresses.

In practicing this invention, there is provided a relay having a plurality of windings mutually coupled. One of the plurality of windings is connected into the output circuit of a transistor. Another of the relay windings is used as a feedback to an input circuit to the transistor control circuit for the purpose of providing adequate signal duration to allow relay triggering or energization.

In each of the several views like parts are similar reference characteristics.

Figure 1:
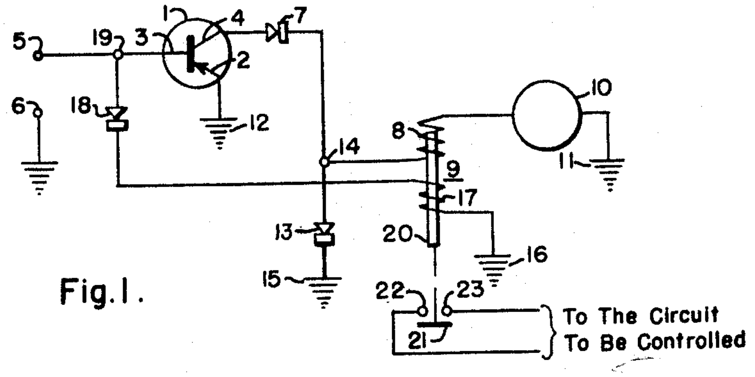
FIG. 1 is a schematic view of one embodiment of this invention.

The transistor circuit of FIG. 1 comprises a transistor 1 having a grounded emitter 2, a base 3, and a collector 4. The transistor being of the grounded emitter type has an input circuit capable of receiving microsecond impulses at the terminals 5 and 6 connected to the base 3 and to ground, respectively. The output circuit of the transistor is provided with a diode 7 connected in series with a winding 8 of a polarized two-winding relay 9 and through an alternating current source of power 10 to the ground point 11. With the emitter 2 grounded at point 12, it can be seen that a complete output circuit is formed between the collector and emitter of the transistor 1. Since it is necessary for the relay 9 to be a polarized relay capable of response to one-half cycle of the alternating current source 10, a rectifier 13 is connected to a point 14 between the diode 7 and the winding 8 of the relay 9. The other terminal of the polarizing rectifier 13 is then connected to ground point 15.

Since it is the purpose of this circuit to provide relay response to input impulses of microsecond duration, it is necessary to provide a means for the relay to respond to the microsecond impulse since the relay is not capable of attracting its armature on an input pulse of such short duration. This control is provided through the use of a feed-back circuit extending from the ground point 16 through the feed-back relay winding 17 mutually coupled with the relay control winding 8 through the polarizing rectifier 18 to the terminal point 19 connected to the input base 3 of the transistor 1.

The relay 9 is provided with an armature 20 normally biased downward by any suitable means such as gravity and capable of movement in the opposite direction in response to the energization of the winding 8 by sufficient current. The armature 20 is provided with a movable contact member 21 capable of bridging the contact points 22 and 23 of the circuit to be controlled. The circuit to be controlled is not shown in this invention since this circuit can be any suitable circuit and does not involve any portion of this invention.

Figure 2:
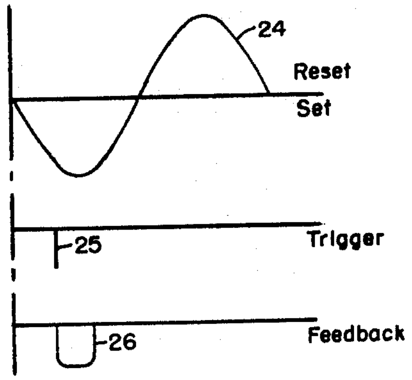
FIG. 2 is a view of a family of curves showing a typical voltage application to the circuit of FIG. 1 for the purpose of providing relay triggering.

Operation of the circuit shown in FIG. 1 will now be described. If we assume that the transistor of FIG. 1 is a P-N-P transistor and the source 10 in its output circuit is providing a voltage following a sinusoidal wave form such as shown by the curve 24 of FIG. 2, it can be seen that the winding 8 of relay 9 is provided with current flow on every other half cycle of the source 10 due to the rectifier 13 allowing current flow only on one-half cycle of the source 10 wave form. The magnitude of the current flow through the winding 8 will always reset the polarized relay in its neutral position, if it has been operated during the previous half cycle. If the armature 20 has already returned to the neutral state then it will not move. If we now assume that a negative microsecond impulse is applied between the terminals 5 and 6 of the input circuit to the transistor 1, it can be seen that conduction through the transistor 1 occurs causing current to flow through the load diode 7 and the winding 8 of the relay 9. Current flow through the control winding 8 of the relay 9, if of long enough duration, would provide for armature 20 attraction and movement. However, since the impulse applied to the terminals 5 and 6 is of such short duration, the relay armature having a certain amount of inertia would not have sufficient time to move to its attracted position. At this time, however, the feed-back winding 17 of the relay 9 is provided with increasing flux established by the control winding 8 which is, with the winding properly wound, of the proper direction to cause a current of the proper polarity to pass through the rectifier 18 and be applied to the terminal point 19 in the input circuit of the transistor 1. The microsecond impulse, which is applied to the terminals 5 and 6, is represented by the curve 25 shown in FIG. 2. The feed-back impulse provided by the feed-back winding 17 of the relay 9 is shown by the curve 26 of FIG. 2.

Since it takes a period of time for the flux in the winding 17 to increase, the impulse current 26 applied to the base 3 of the transistor 1 maintains the flow of current through the control winding 8 of the relay 9 for a time sufficient to allow the armature 20 to be attracted. At this time the bridging contacts 21 makes contact with the terminal points 22 and 23 to complete the control circuit. The relay armature 20 will then remain attracted through substantially the remainder of the negative half cycle of the voltage source 10. During the following positive half cycle of the voltage source 10, the relay armature again is dropped out, and the relay is conditioned for reenergization on any following negative half cycle upon the appearance of a negative microsecond impulse between the terminals 5 and 6.

It should be pointed out that if the microsecond impulse 25 had been in a positive direction with the transistor being of a P-N-P type as shown, the relay would have remained deenergized since the impulse would have been of an improper polarity to cause transistor conduction. It is pointed out further that if an N-P-N type transistor is used, it will be necessary to reverse the rectifiers 13 and 18 and further necessary to provide a positive microsecond impulse to the control circuit to obtain operation.

Figure 3:
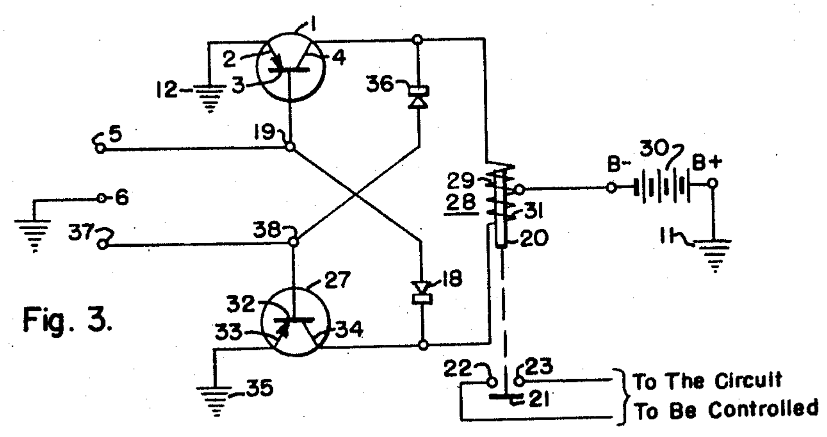
FIG. 3 is a schematic view showing another embodiment of this invention.

The embodiment shown in FIG. 3 involves the use of a control transistor 1 and a reset transistor 27 for the purpose of controlling a relay 28 capable of maintaining its last energized position. In this case, the source of power in the output circuit common to the transistors 1 and 27 is a direct current source of power rather than an alternating current source of power.

If we assume that the transistor 1 is a transistor used to set the relay 28 to its circuit controlling position and further if the transistor is also of the P-N-P type having its emitter 2 grounded, operation of this half of the control cycle is similar to that described in FIG. 1. For example, if we assume that a negative microsecond impulse appears across the terminals 5 and 6 in the input to the transistor 1, the impulse is subsequently applied to the emitter 2 and the base 3 of the transistor 1. This controlling impulse therefore causes conduction between the emitter 2 and collector 4 causing current to flow from the collector 4 through the winding 29 of the relay 28 through the direct current source 30 to the ground point 11. This current flow, although in the proper direction to attract the armature 20, is of insufficient time duration to allow the armature 20 to be attracted. At the same time the flux is established in the winding 31 of the relay 28 during its decay period causing current to flow through the rectifier 18 to the terminal point 19 in the base circuit 3 of the transistor 1. The current supplied to the terminal point 19 by the winding 31 of the relay 28 then provides sufficient input control over a sufficient time period to allow the armature 20 of the relay 28 to be moved to a position allowing the contact bridging member 21 to bridge the contacts 22 and 23 of the circuit to be controlled.

Since the relay 28 is not biased to either extreme position, the relay will remain in its last moved position until a reset voltage is applied causing the relay to move to its other position. For this purpose the transistor 27 is provided. The transistor 27 is provided with a base 32, an emitter 33 and a collector 34. The emitter 33 is grounded through the ground point 35, and the base-to-emitter input circuit is provided with a feed-back circuit including a rectifier 36 and the winding 29 of the relay 28. The microsecond impulse for the purpose of triggering the relay 27 is applied between the contact point 37 connected to the base terminal 32 of the transistor 27 and the ground point 6.

If we assume that the relay armature 20 is in its previously described position, allowing the contact bridging member to bridge the points 22 and 23 of the circuit to be controlled, and it is desired to return the armature 22 to its original position, a negative microsecond impulse is applied between the terminals 37 and 6. This microsecond impulse causes conduction of the transistor 27 which again allows current flow through the winding 31 of the relay 28 which, in turn, induces a current in the winding 29 of the relay 28 which during flux increase is of the proper polarity to pass through the rectifier 36 to be applied to the terminal point 38 in the input circuit of the transistor 27. In a manner similar to the operation of the feed-back circuits previously described the conduction of the transistor 27 is prolonged for a sufficient time duration to allow the armature 20 to be attracted to its opposite position, that is, toward the winding 31 to thus interrupt the circuit to be controlled by moving the bridging contact 21 away from the contacts 22 and 23. The cycle can then be repeated by the introduction of new microsecond impulses.

Figure 4:
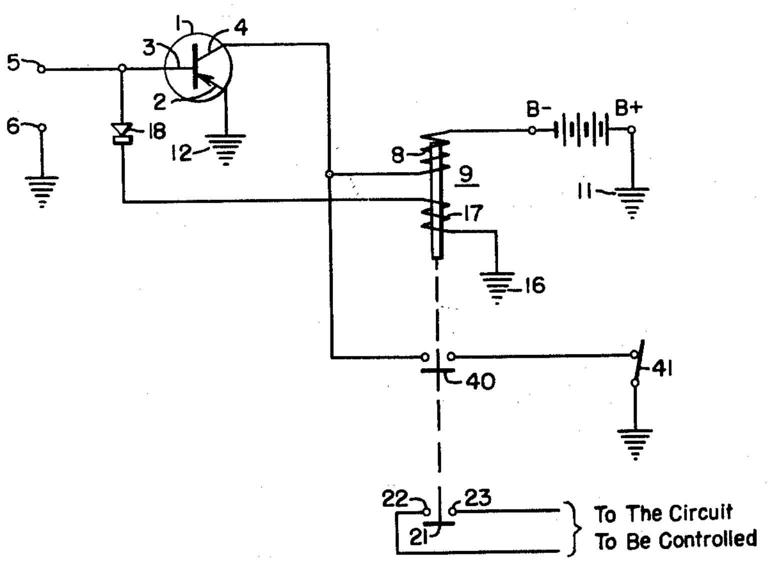
FIG. 4 is a schematic view showing still another embodiment of this invention.

The embodiment shown in FIG. 4 is identical with the embodiment shown in FIG. 1 and previously described with the exception that the source of power is direct current eliminating the need for the diode 7 of FIG. 1 and the relay winding 8 is provided with a holding circuit through its own armature 20 contact 40 and a series connected normally closed reset contact 41.

With the arrangement of FIG. 4 the relay, once energized remains energized until contact 41 is opened interrupting the holding circuit.

While the embodiments disclosed in the preceding specification is preferred, other modifications will be apparent to those skilled in the art which do not depart from the scope of the broadest aspects of the present invention.

What is claimed is:

1. A relay trigger circuit comprising a transistor amplifier which is rendered conductive upon application of a pulse of a predetermined polarity to the input of said amplifier, a relay having an armature and a first and second mutually coupled windings, said first winding connected to the output of said amplifier, said second winding connected to the input of said amplifier, said second winding being arranged in such a way that a positive feedback is obtained from the output to the input of said amplifier, a unidirectional current device connected in series with said second winding and the input of said amplifier in such a way that the input impedance of the amplifier is high for said pulses but a low impedance is obtained for feedback current, and a current path including a source of alternating current, another unidirectional current device and said first winding to effect resetting said armature to a neutral position on every other half cycle of said source.

2. A relay trigger circuit comprising a first and a second transistor amplifier, said first and said second amplifiers being rendered conductive upon application of a pulse of a predetermined polarity to the inputs thereof, a relay having a first and a second winding mutually coupled, said relay having an armature capable of remaining in its last operated position, said first winding being connected to the output of said first transistor amplifier, said second winding being connected to the output of said second transistor amplifier and via a unidirectional current device to the input of said first amplifier in such a way that positive feedback is obtained from the output to the input of said first transistor amplifier, said first winding being further connected via another unidirectional current device to the input of said second transistor amplifier in such a way that a positive feedback is obtained from the output to the input of said second transistor amplifier.

References Cited in the file of this patent

UNITED STATES PATENTS 2,801,374 Svala ---------------- July 30, 1957